United States Patent [19]

Lin

[11] Patent Number: 5,261,260

[45] Date of Patent: Nov. 16, 1993

[54] REMOTE-CONTROL DOOR LOCK FOR A DOG CAGE

[76] Inventor: Chen-Che Lin, No. 13-30, Ting An Tsun, Hsin Ying, Tainan Hsien, Taiwan

[21] Appl. No.: 991,269

[22] Filed: Dec. 16, 1992

[51] Int. Cl.⁵ .............................................. E05B 47/00
[52] U.S. Cl. ........................................ 70/280; 292/76; 292/144; 292/252; 292/DIG. 25
[58] Field of Search ........................ 70/277, 280, 257; 292/70, 76, 77, 144, 252, DIG. 25

[56] References Cited

U.S. PATENT DOCUMENTS

| | | | |
|---|---|---|---|
| 98,684 | 1/1870 | Gammell | 292/70 X |
| 392,924 | 11/1888 | Klein et al. | 292/77 X |
| 1,194,991 | 8/1916 | Gervais | 292/76 X |
| 1,692,366 | 11/1928 | Bean | 292/77 X |
| 2,535,947 | 12/1950 | Newell | 292/252 |
| 3,141,566 | 7/1964 | Carpenter | 292/76 X |
| 3,996,591 | 12/1976 | Hayward | 292/144 X |
| 4,509,347 | 4/1985 | Young | 292/144 X |

FOREIGN PATENT DOCUMENTS

| | | | |
|---|---|---|---|
| 8939 | 4/1904 | United Kingdom | 292/77 |
| 499516 | 1/1939 | United Kingdom | 292/76 |

Primary Examiner—Lloyd A. Gall
Attorney, Agent, or Firm—Morton J. Rosenberg; David I. Klein

[57] ABSTRACT

A remotely controlled door lock for a dog cage is provided. The door lock includes a pair of solenoids connected to a latch bolt, and a main controller which receives a radio frequency control signal from a remote radio transmitter. The main controller decodes the signal and sends it to one of the solenoids to retract the latch bolt from engagement with the cage door, or extend it into engagement therewith.

1 Claim, 3 Drawing Sheets

REMOTE-CONTROL DOOR LOCK FOR A DOG CAGE

BACKGROUND OF THE INVENTION

Farmers or people living in the suburbs or countryside often keep fierce dogs to protect their home and domestic animals from thieves. The dogs generally have to be secured in cages so as not to suddenly attack a visitor, and bite him or worse. The cages would then have to be opened manually to let the dogs our. If the cages are located quite far from their owners' houses, the dogs cannot be released quickly from the cages.

SUMMARY OF THE INVENTION

This invention, a remote-control door lock for dog cages, has been devised to supply a door lock for a dog cage which can be remotely controlled to unlock the door of the dog cage, thereby allowing the dog kept therein to push open the door to exit the cage.

The remote-control door lock for dog cages in the present invention, comprises an interface driving unit and a main controller.

The interface driving unit consists of a housing, two electromagnetic solenoids installed lengthwise in the housing and connected with a latch bolt to electrically move the latch bolt out or retract for locking or unlocking a door of a dog cage by a signal from the main controller, which receives a coded RF (radio frequency) signal from a radio transmitter, decodes it and then sends a signal to the interface driving unit. Then, one of the electromagnetic solenoids in the interface driving unit is energized to generate a magnetic field to retract the latch bolt from a locked position to an unlocked position, allowing the door of the dog cage to be opened, or the latch bolt is extended from the unlocked position to the locked position, depending on which solenoid is energized.

This invention has two advantages in practical use.

1. A dog can be released from a cage placed far from the owner's house by unlocking a remote control door lock of the cage immediately when a thief is discovered.

2. A temporary closing unit is provided with this lock, so even though unlocked, the cage door is still maintained in a closed position, until the dog kept therein pushes it open.

BRIEF DESCRIPTION OF THE DRAWINGS

The invention will be better understood by reference to the accompanying drawings, wherein.

DETAILED DESCRIPTION OF THE PREFERRED EMBODIMENTS

Figure 1:
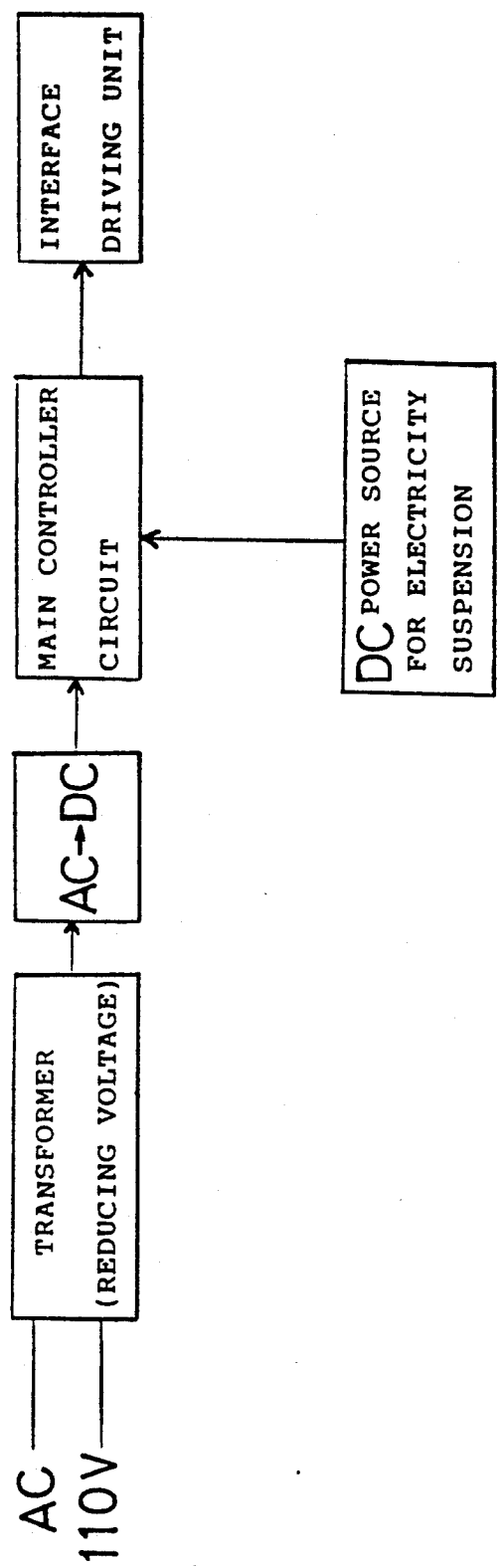
FIG. 1 is a block diagram of an electric circuit for the remote control door lock of the present invention.
Figure 2:
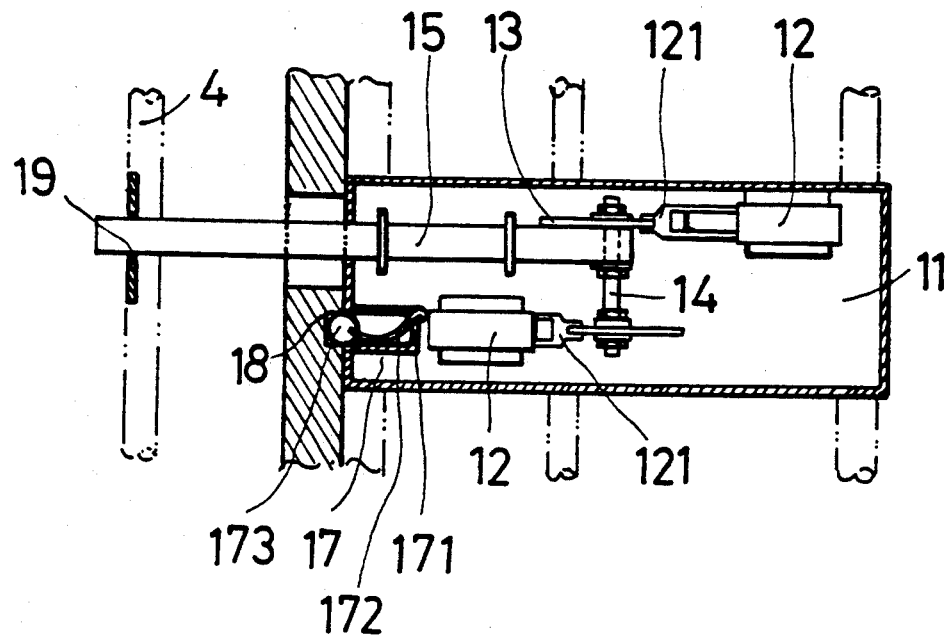
FIG. 2 is a cross-sectional view of the interface driving unit of the present invention in a closed condition.
Figure 4:
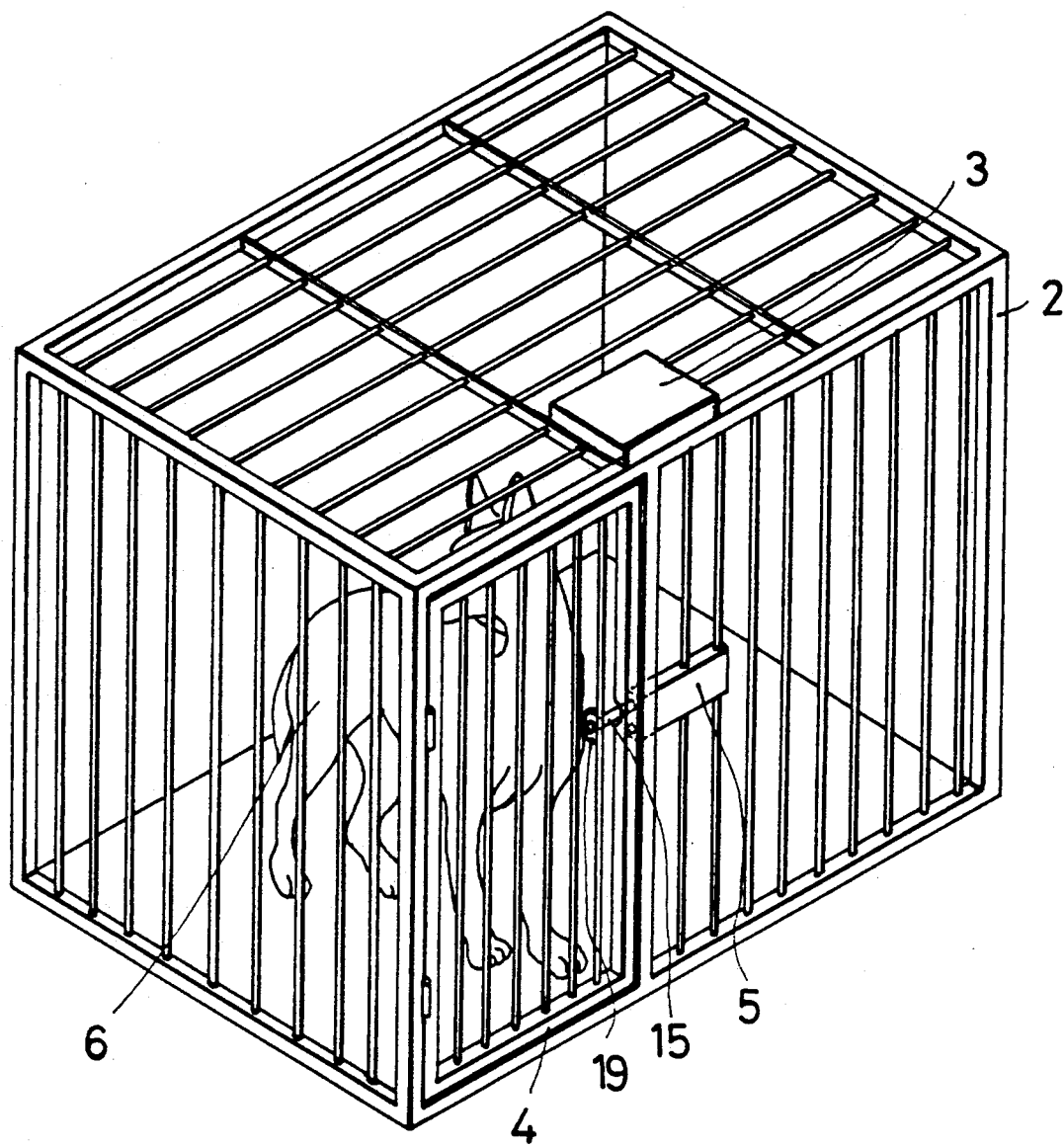

A remote-control door lock for a dog cage, as shown in FIGS. 1, 2 and 4, comprises a main controller 3, and an interface driving unit 5. The main controller 3 includes a transformer for reducing the magnitude of an AC voltage source, and a rectifier to convert the AC voltage to a DC voltage. A battery unit is preferably included in the main controller 3 to supply electricity in case of a power failure of the AC source.

The interface driving unit 5 is secured on one side of a dog cage adjacent the door 4. The interface driving unit 5 includes a housing 11, and two electromagnetic solenoids 12, 12 fixed inside the housing 11. Each electromagnetic solenoid 12 has an armature 121 connected to an extension member 13. The two extending members 13, 13 are connected to the latch bolt 15 by a laterally extending pin 14. The pin 14 passes through a lateral hole formed in one end of the latch bolt 15. The latch bolt 15 extends from the housing 11 and is partially supported by a pair of feet 16 fixed to the housing in spaced parallel relation.

A temporary closing unit 17 is also provided in the housing 11, on a side thereof abutting a vertical steel bar of a dog cage door 4. The housing side wall having an enclosed recess 171 aligned with a recess 18 formed in a frame of the cage door 4. A spring plate 172 has a steel ball affixed to one of it ends, the ball 173 being sized to at least partially engage the recess 18 of the frame of the cage door 4.

Figure 3:
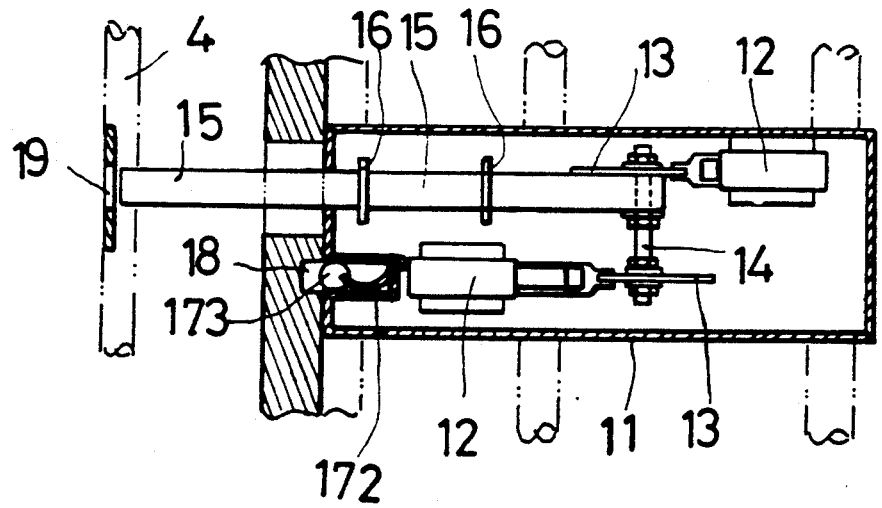
FIG. 3 is a cross-sectional view of the interface driving unit of the present invention in an open condition; and, FIG. 4 is a perspective view of the interface driving unit of the present invention fixed to a dog cage.

A user sends a control radio frequency signal from a remote transmitter (not shown) to the main controller 3, placed on a dog cage 2. Then the main controller 3, provided with a decoder (not shown), decodes the control signal sent out by the remote transmitter, and sends the decoded signal to the interface driving unit 5. Next, a respective one of the electromagnetic solenoids 12 in the interface driving unit 5 is actuated by the decoded signal current to generate a magnetic field, and thereby attract a respective armature 121 and its respective extension member 13, as shown in FIG. 3. The latch bolt 15, with its distal end initially disposed in locking hole 19 of cage door 4, is retracted from the locking hole 19 by operation of a solenoid 12. Then a dog 6 in the cage 2 may push the cage door 4, which will be opened by displacement of the spring biased ball 173 into the enclosed recess 171.

While the preferred embodiments of the invention have been described above, it will be recognized and understood that various modifications may be made therein and the appended claims are intended to cover all such modifications which may fall within the spirit and scope of the invention.

What is claimed is:

1. A remote-control door lock for enabling release of a dog from a cage, comprising:

control means secured to said dog cage for decoding a radio frequency signal transmitted by a remotely located transmitter and generating control signals responsive thereto; and, reversible locking means electrically coupled to said control means for locking and unlocking said door responsive to said control signals generated by said control means, said locking means including:

a. a housing secured to said dog cage adjacent a door thereof;

b. a latch bolt disposed within said housing, said latch bolt being extendable from said housing in a direction parallel to a longitudinal axis of said latch bolt for engagement with an opening formed in said door when said latch bolt is in a first position;

c. a first solenoid disposed within said housing, said first solenoid being electrically coupled to said control means and having a first armature coupled to said latch bolt for displacement thereof from said first position to a second position responsive to energization to said first solenoid, said latch bolt being disengaged from said opening formed in said door when in said second position, said first armature being disposed in parallel relation with said longitudinal axis of said latch bolt;

d. a second solenoid disposed within said housing, said second solenoid being electrically coupled to said control means and having a second armature coupled to said latch bolt for displacement thereof from said second position to said first position responsive to energization to said second solenoid, said second armature being disposed in parallel relation with said longitudinal axis of said latch bolt; and, e. catch means disposed within a recess formed in a side wall of said housing adjacent said door for frictionally retaining said door in a closed position when said latch bolt is in said second position, until displaced by a dog from within said cage, said catch means including a ball-shaped member coupled to one end of a biasing spring for releasable engagement with a recess opening formed in said door.

* * * * *